United States Patent
Peterson et al.

(10) Patent No.: US 7,246,092 B1
(45) Date of Patent: Jul. 17, 2007

(54) MONTAGE FOR AN ELECTRONIC MARKET

(75) Inventors: Karen Peterson, Fairfield, CT (US);
Alyssa Ligammari, Staten Island, NY (US); Paul Niche, Wilton, CT (US);
Paul Zaremba, Bethesda, MD (US);
Peter Martyn, Ridgewood, NJ (US);
Thomas Boyce, Milford, CT (US);
Christopher Kokis, Monroe, CT (US);
Robert Wheelock, Southbury, CT (US)

(73) Assignee: The Nasdaq Stock Market, Inc., Washington, DC (US)

( * ) Notice: Subject to any disclaimer, the term of this patent is extended or adjusted under 35 U.S.C. 154(b) by 0 days.

(21) Appl. No.: 09/569,524

(22) Filed: May 12, 2000

(51) Int. Cl.
*G06Q 40/00* (2006.01)

(52) U.S. Cl. .................. 705/37; 705/35; 705/36; 705/38; 705/39; 705/40

(58) Field of Classification Search ............. 705/37, 705/35–36, 38–40
See application file for complete search history.

(56) References Cited

U.S. PATENT DOCUMENTS

| | | | | |
|---|---|---|---|---|
| 5,077,665 | A | * | 12/1991 | Silverman et al. ............. 705/37 |
| 5,297,031 | A | * | 3/1994 | Gutterman et al. ............ 705/37 |
| 5,297,032 | A | | 3/1994 | Trojan et al. ................. 364/408 |
| 6,012,044 | A | | 1/2000 | Maggioncalda et al. ...... 705/36 |
| 6,014,643 | A | | 1/2000 | Minton ......................... 705/37 |
| 6,195,647 | B1 | | 2/2001 | Martyn et al. ................. 705/37 |
| 6,272,474 | B1 | | 8/2001 | Garcia ........................... 705/37 |
| 6,278,982 | B1 | * | 8/2001 | Korhammer et al. .......... 705/37 |

FOREIGN PATENT DOCUMENTS

WO    WO 91 14231    9/1991
WO    WO 98 13778    4/1998

OTHER PUBLICATIONS

NASDAQ, USPTO Presentation, Nov. 8, 2001 (1994 and 1999), NASDAQ, pp. 1-14.*
Securities and Exchange Commission, Proposed Rule Change, NASD, Inc., Feb. 5, 1999, 61 pps.
"Nasdaq Workstation II", Nasdaq Stock Market, XP002171886, May 1999, pp. 1-17 (www.nasdaqtrader.com/trader/tradingservices/productservices/userguides/userguides.stm).

(Continued)

*Primary Examiner*—Richard E. Chilcot, Jr.
*Assistant Examiner*—Timothy M. Harbeck
(74) *Attorney, Agent, or Firm*—Fish & Richardson P.C.

(57) ABSTRACT

A dynamic quote window for a securities system includes a quote montage that displays quotes from market participants to buy or sell a security and a plurality of controls disposed proximate to the quote montage, each of the controls displaying a price level and aggregated quote size at the price level for the security. The aggregate controls display aggregated quotes at various price levels that represents publically displayed, available liquidity. Market participants can see the depth of the quotes at the inside. Also described in a multi-order window which when populated and transmitted can generate orders to capture all shares available at the price corresponding to the aggregate interest control depressed and better.

32 Claims, 8 Drawing Sheets

OTHER PUBLICATIONS

"Self Regulatory Organizations: Notice of Filing of Proposed Rule Change by the National Association of Securities Dealers, Inc." Federal Register—Securities and Exchange Commission, vol. 64, No. 47, Mar. 11, 1999, pp. 12198-202, XP002171885 (198.17.75.65/fril/).

"Self Regulatory Organizations: Notice of Filing of Proposed Rule Change by the National Association of Securities Dealers, Inc." Federal Register—Securities and Exchange Commission, vol. 64, No. 77, Apr. 22, 1999, pp. 19844-49, XP002171896 (198.17.75.65/fril/).

Reich, Benny and Ben-Shaul, Israel: "A Componentized Architecture for Dynamic Electronic Markets", Sigmod Record, vol. 27, No. 4, Dec. 1998, pp. 40-47, XP002171887 (www.acm.org).

* cited by examiner

MONTAGE FOR AN ELECTRONIC MARKET

BACKGROUND

This invention relates to display of orders and quotes in electronic markets.

Electronic equity markets, such as The Nasdaq Stock Market® display pre-trade information to all market participants. Such markets often have multiple systems to receive the pre-trade information. One system may be for small orders whereas another may be for larger orders or orders that get executed in different manner, e.g., by negotiation rather than auto execution.

In a market such as Nasdaq small orders are delivered by the Nasdaq Stock Market's Small Order Execution System ("SOES"). The SOES provides a simple and efficient vehicle to execute small agency orders at the so called inside quote, report trades for public dissemination, and send trades to clearing for comparison and settlement. In the SOES system, trading is done automatically and is negotiation-free. In response to the October 1987 market break, SOES was enhanced in several respects to provide individual investors with guaranteed liquidity and assured access to market makers in times of market disruption. In particular, SOES participation was made mandatory for all market makers in Nasdaq national market securities.

An example of another system used to access the same market is the Nasdaq Stock Market's SelectNet, originally referred to as the Order Confirmation Transaction Service ("OCT"). SelectNet provides an alternative to telephone contact among trading desks for negotiating trades. SelectNet is an electronic screen-based order routing system that allows market makers and order-entry firms (collectively referred to as "participants") to negotiate securities transactions in market securities through computer communications rather than relying on the telephone. Unlike SOES, SelectNet offers the opportunity to negotiate for a larger size or a price superior to the current inside price, i.e., best bid best offer.

SelectNet currently allows subscribers to direct, or "preference" orders to specified market makers or to broadcast orders to all market participants. Although SelectNet is an order delivery service, rather than an order execution service, a preferenced SelectNet order presented to a market maker at its displayed quote generally gives rise to liability under SEC Rule 11Ac1-1 ("Firm Quote Rule") for the market maker to execute the transaction at that price.

SelectNet is the link to Electronic Communications Networks ("ECNs"). OTC market makers are required to make publicly available any superior prices that the market maker privately quotes through an ECN. A market maker may comply with this requirement by changing its quote to reflect the superior price or, in the alternative, may deliver better priced orders to an ECN provided that the ECN disseminates these priced orders to the public quotation system and provides broker-dealers equivalent access to these orders.

SUMMARY

According to an aspect of the invention, a graphical user interface for an electronic trading system includes a negotiation montage that displays quotes at various price levels for a product, the quotes being posted from a plurality of market participants and a plurality of controls that display a plurality of price levels for quotes for the product at current pricing conditions for the product.

According to an additional aspect of the invention, a dynamic quote window for a securities system includes a quote montage that displays quotes from market participants to buy or sell a security and a plurality of controls disposed proximate to the quote montage, each of the controls displaying a price level and aggregated quote size at the price level for the security.

According to an additional aspect of the invention, a method of submitting an order in a electronic trading system includes displaying a graphical user interface for the electronic trading, the graphical user interface including a negotiation montage that displays quotes at various price levels for a product and a plurality of controls that display a plurality of price levels for quotes for the product at current pricing conditions for the product and selecting one of the plurality of controls to enter an order at the opposite side of the market from the quote for quotes that are in the system at the price level represented in the control.

According to an additional aspect of the invention, a graphical user interface for an electronic trading system, includes a market order entry window that is automatically populated with quotes available at selected price levels by order-type based on a security and market participant.

One or more of the following advantages are provided by one or more aspects of the present invention.

The montage with the aggregate controls display aggregated quotes at various price levels that represents publically displayed, available liquidity. Market participants can see the depth of the quotes at the inside. Trading at the inside quote plus two ticks away is where the most of the liquidity generally exists in a market.

Transmitting generated orders can capture all shares available at the price corresponding to the aggregate interest button or control depressed and better.

DESCRIPTION

Figure 1:
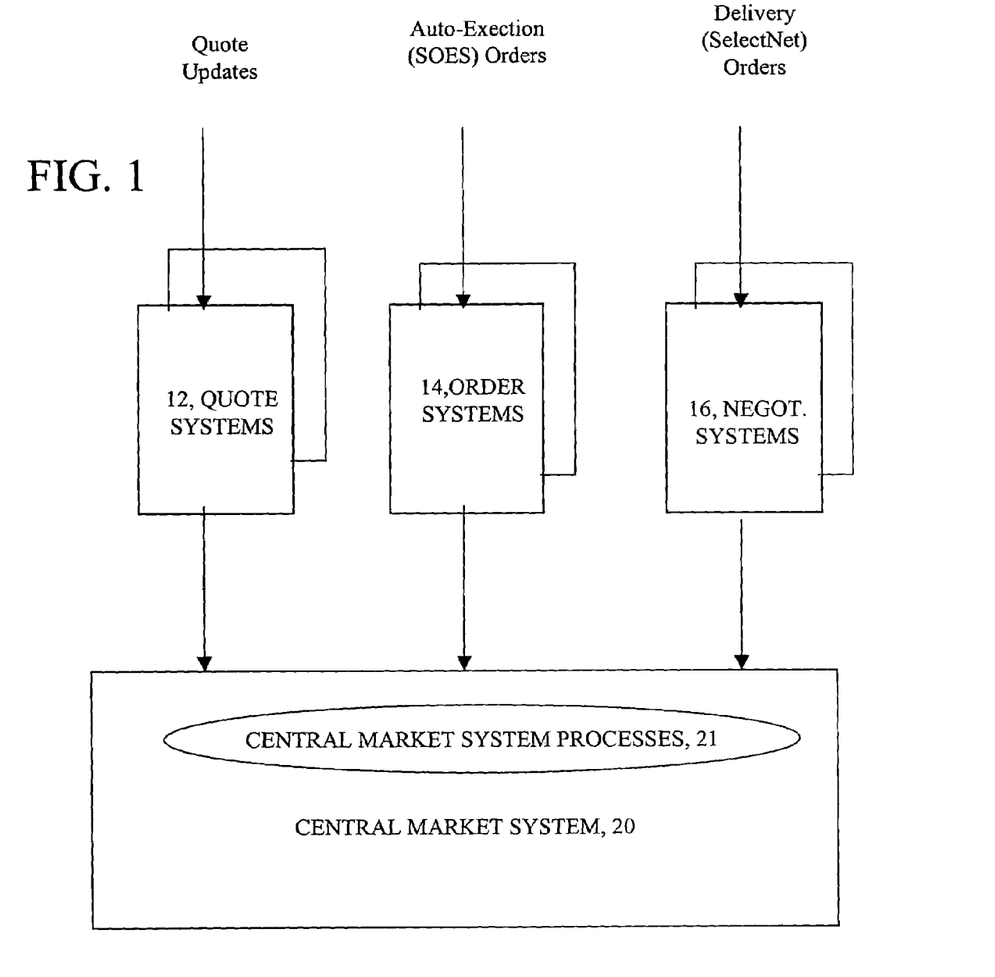
FIG. 1 is a block diagram of an order delivery system for an electronic market.

Referring now to FIG. 1, an order/quote entry system 10 for a central market system 20 such as The Nasdaq Stock Market® is shown. The order/quote entry system 10 includes a plurality of quote systems 12 for entering quote information into the central market system 20, a plurality of order systems 14 for entering auto executable orders into the system and a plurality of negotiation systems 16 for entering negotiable orders into the system 20. Each of the quote systems 12, order systems 14 and negotiation systems 16 operate using protocols as will be described below. In addition, each of the systems are used by market participants such as market makers, electronic communication networks and exchanges that are coupled into the market 20. Systems 14 and 16 are also used by broker/dealers for order entry only. Each of the quote systems 12, order systems 14 and negotiation systems 16 represent client systems or stations at the aforementioned market participants. The central market system 20 also includes a central market process 21.

Figure 2:
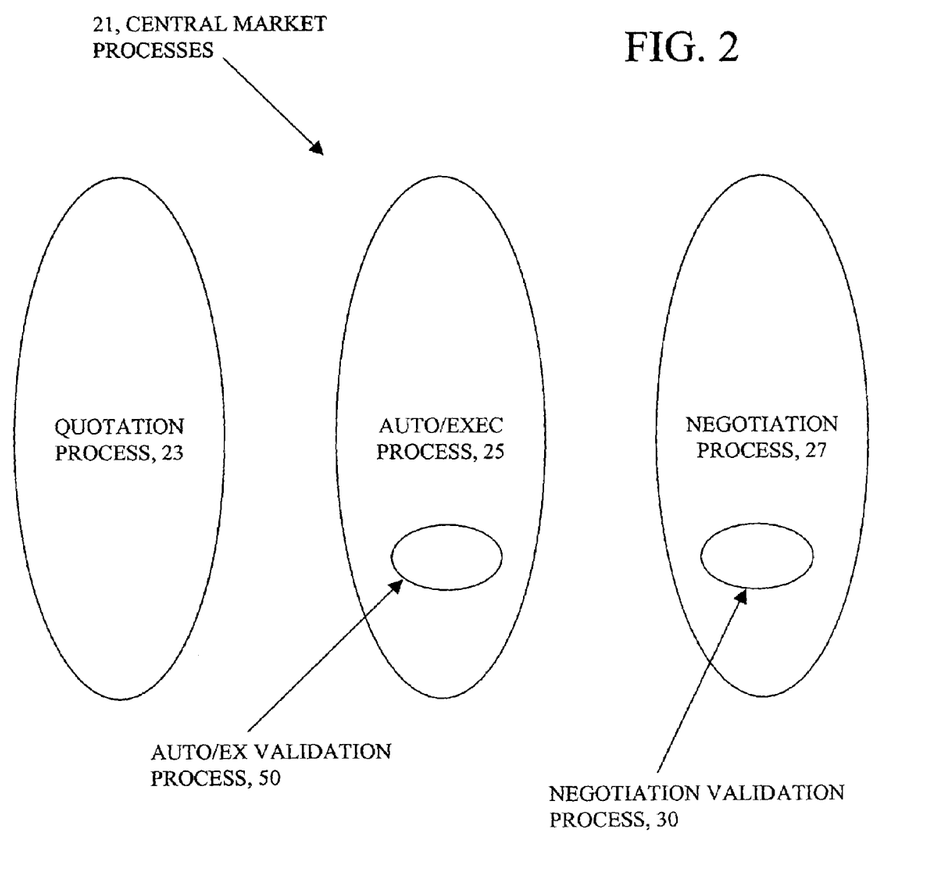
FIG. 2 is a logic view of central market processes.

Referring now to FIG. 2, the central market process 21 of the central market system 20 includes three asynchronous processes 23, 25 and 27 that are used for entering quotes, auto execution of orders or delivery of orders, respectively, in the market system 20. In addition, although not shown, market system 20 would also include processes to validate trades and report trades as is generally done in electronic markets. The central market process 21 includes a quotation process 23 which interfaces with the quotation systems 12 at various quotation market participants. The quotation system 23 is used to receive quotes from market participants, update quotes and send updated quotation information to all market participants.

A preferred technique to display quote information to market participants uses an order display window 150 as will be described in FIG. 8. The order display window 150 (FIG. 8) is a graphical user interface that is produced using techniques similar to the so-called Nasdaq II Workstation or other equivalent protocols. The order display window 150 can be hosted by client system or by the server or market host system. The hosting system would on an continual basis examine current quote information for a security, calculate aggregate sizes at price levels and populate the order display window with the data. The order display window 150 in FIG. 8 expands market information presented to market participants such as by showing displayed depth in the market.

The central market process 21 also includes an auto execution process 25 that interfaces with an auto execution type of system such as the small order execution system (SOES) protocol mentioned above. The auto execution process 25 also includes a validation process 50 (FIG. 5) that is used to validate whether an order entered into the system is a valid order for execution in the auto execution process 25.

The central market process 21 also includes a negotiation process 27. The negotiation process 27 interfaces negotiation systems 16 which deliver orders for negotiation such as the SelectNet system as also described above. The negotiation process 27 also includes a validation process 30 which is used to validate whether orders entered over the negotiation system 16 are valid orders for entry in the negotiation systems.

Figure 8:
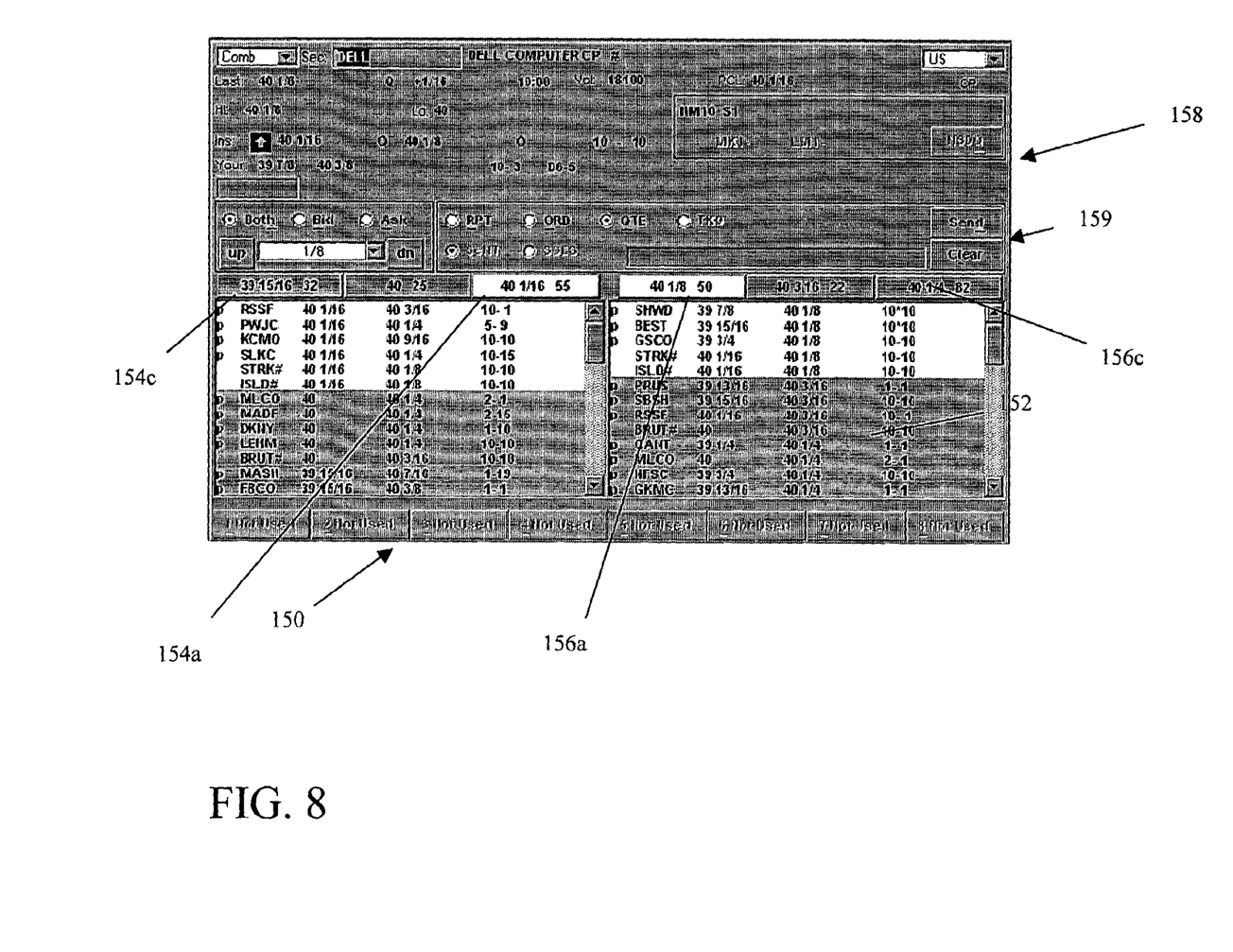
FIG. 8 is a diagram depicting a quote montage.
Figure 9:
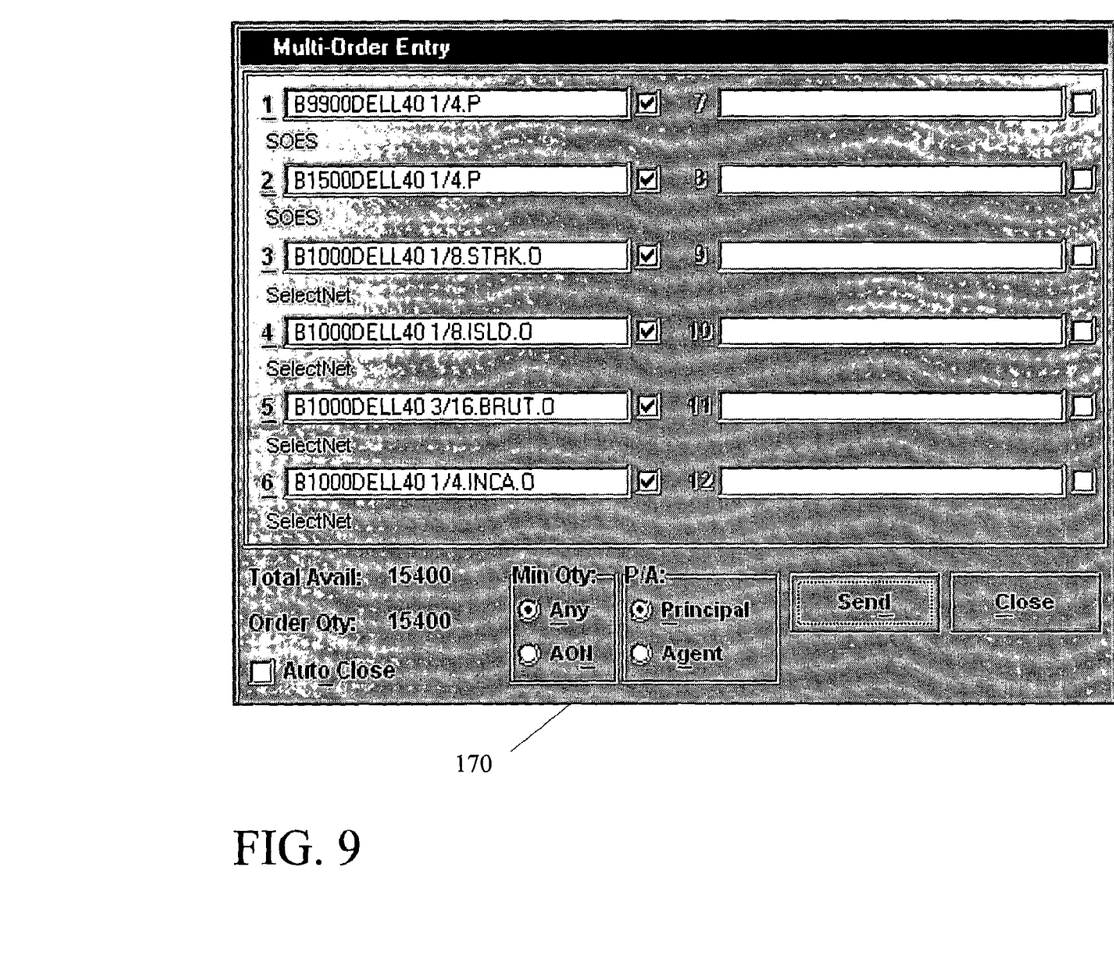
FIG. 9 is a diagram depicting an multi-order window.

Execution or delivery of orders is accomplished using a dynamic, multi-order entry window as shown in FIG. 9. The dynamic order entry window is launched from the order display window of FIG. 8 by selecting controls that represent aggregated interest at particular price levels as will be further described below. In one embodiment the aggregate interest is displayed interest whereas in other embodiments the aggregate interest can be displayed and non-displayed interest.

Thus, the central market system 21 is comprised of three asynchronous processes, the quotation process 23, the auto execution process 25 and the negotiation process 27. In particular, the auto execution process 25 and negotiation process 27 are asynchronous and present the possibility for double liability to market makers who post quotations through the quotation process 23. This double liability, however, is substantially mitigated by modification of the auto execution process 25 and negotiation process 27 to include the validation processes 50 and 30, respectively.

Figure 3:
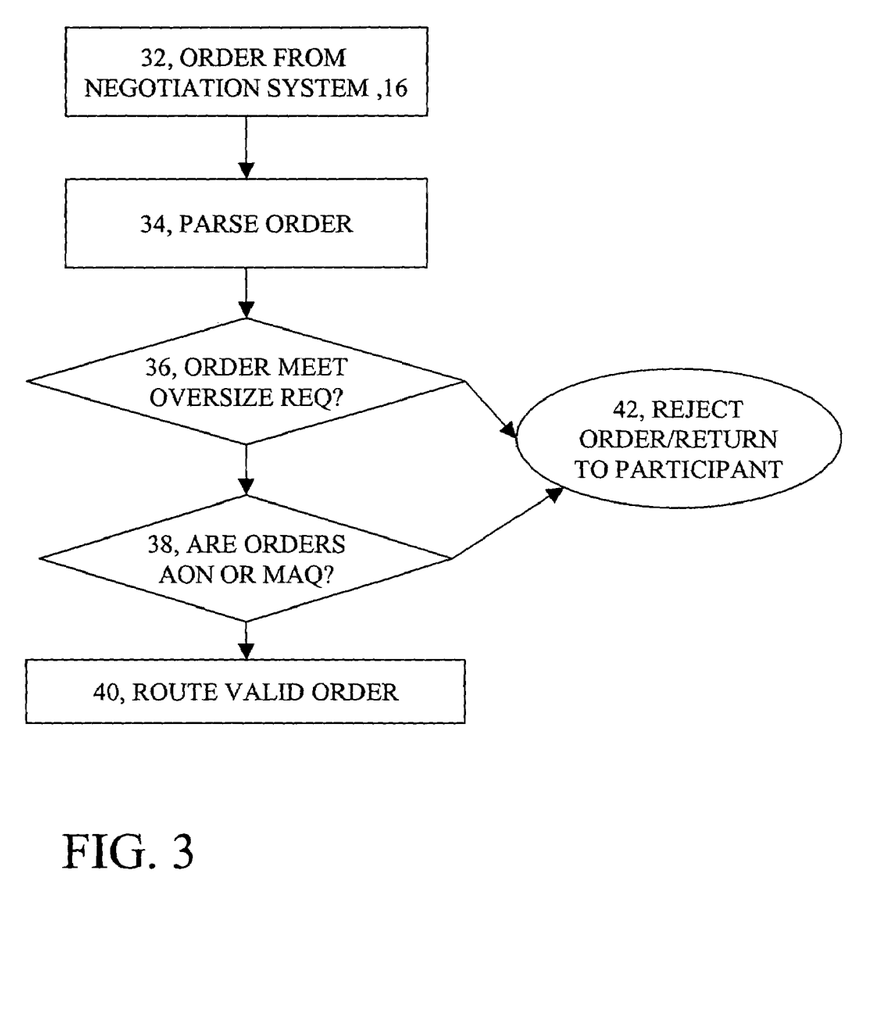
FIGS. 3 and 4 are flow charts depicting processes to handle flows in the order delivery system of FIG. 1.

Referring now to FIG. 3, the negotiate order validation process 30 that is included in the negotiation process 27 that operates on negotiation systems 16 is shown. The process 30 can be run either as a client process on negotiation systems 16, a server process in a server (not shown) that is in the market system 20, or a procedure that follows business requirements for use of the negotiation system 16. The order process 30 will be described herein as a server process that is executed in the market system 20 and which checks orders received over negotiation systems 16. The process 30 receives 32 orders from negotiation systems 16 and parses 34 the orders to extract from the orders certain information to determine whether the orders are valid orders for entry in the negotiation system 16. The process 30 will determine 36 whether the received order meets an oversized requirement (i.e., has a size that is larger than any displayed quote) that is placed on orders using the negotiation system 16. For example, the process 30 could require that any order entered in system 16 be for a size which is at least one normal unit of trading, i.e., 100 shares (a round lot) in excess of the displayed amount of a market makers quote to which the order is directed. This so-called oversized order requirement ensures that orders which are sent for negotiation will not bypass orders which could be entered as auto execution orders.

The process 30 also determines whether the orders meet certain conditions. For example, conditions can include that the order is an all or nothing order (AON) of a size that is at least 100 shares greater (a round lot) than the displayed amount of the market maker's quote to which the order is directed, or is a minimal acceptable quantity order (MAC) that has a value that is at least 100 shares greater than the displayed amount of a market maker's quote to which the order is directed. If the oversize requirement conditions are not met or one of the "all or nothing" or "minimal acceptable quantity" conditions are not met, the process 30 will reject the order. This process 30 can be incorporated into a negotiation system such as the existing SelectNet process or other negotiating delivery processes. If all the above requirements are met, the order would be considered a valid order for entry on the negotiation system 16 and thus the process 27 could route the valid order to a directed market participant.

Figure 4:
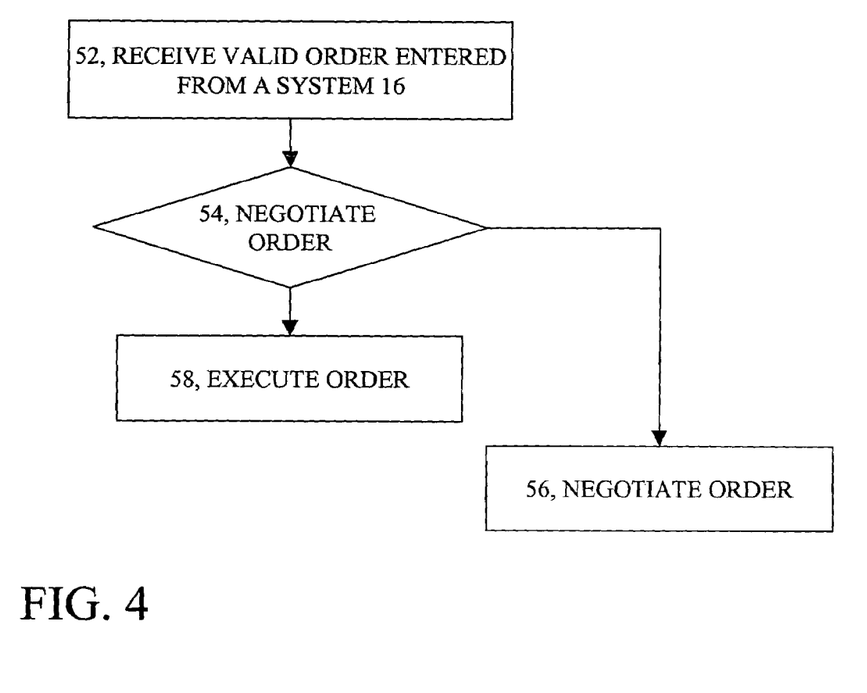

Referring now to FIG. 4, a market maker receives the valid order from a system 16. The market maker determines 54 whether to negotiate the order 56 or execute the order 58. This ensures that market makers are not subject to potential dual liability arising under the Firm Quote Rule as the result of the duplicate receipt of orders through asynchronous systems (i.e., the market maker also receives an execution through the SOES system contemporaneously with receipt of an order from the SelectNet system). This would not prohibit liability for each of potentially two quotes displayed by market makers if the market maker has a proprietary quote and an agency quote as described in U.S. patent application Ser. No. 09/208,942, filed Dec. 10, 1998.

Figure 5:
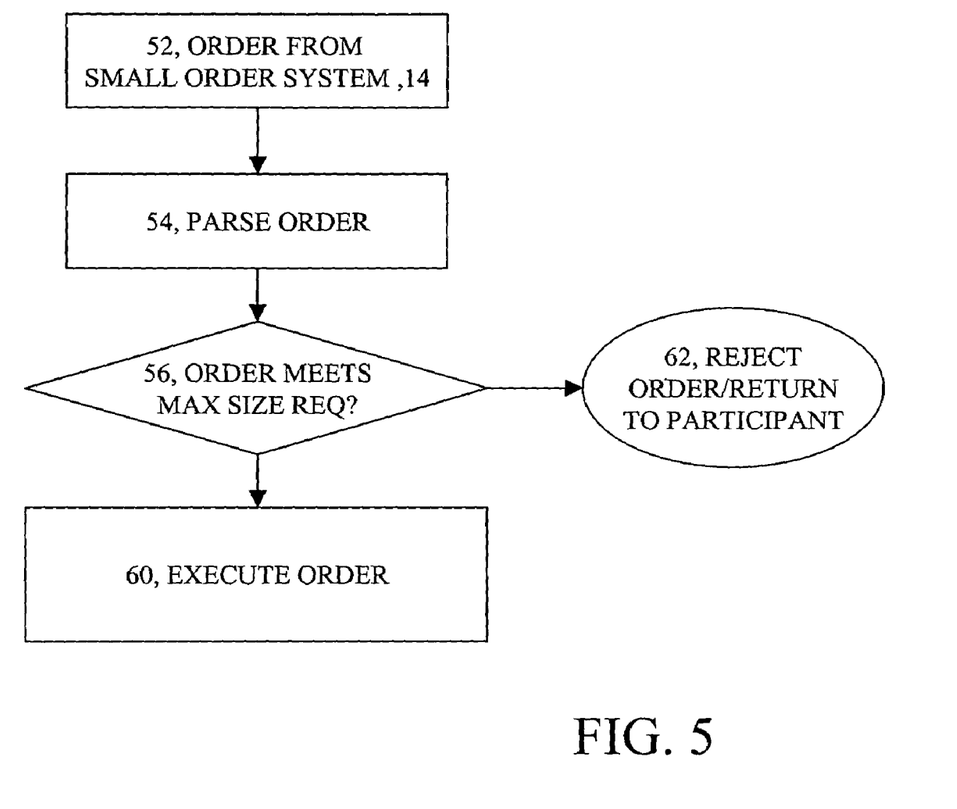
FIG. 5 is a diagram depicting a portion of a quote entry format for the system of FIG. 1.

Referring to FIG. 5, the validation process 50 that is part of the auto execution process running on system 14, e.g., a SOES system, is shown. The system 20 receives an order from a system running a small order execution system 14. The execution system 14 includes process 50 that checks the order to make sure that it is a valid order for the execution system. The process 50 parses 52 the order and determines 54 whether it meets a maximum size requirement for execution of orders over the system. If the order meets the maximum size requirement, the process will execute 54 the order. If the order does not meet a maximum size requirement, it will reject 56 the order and return it to the participant.

Figure 6:
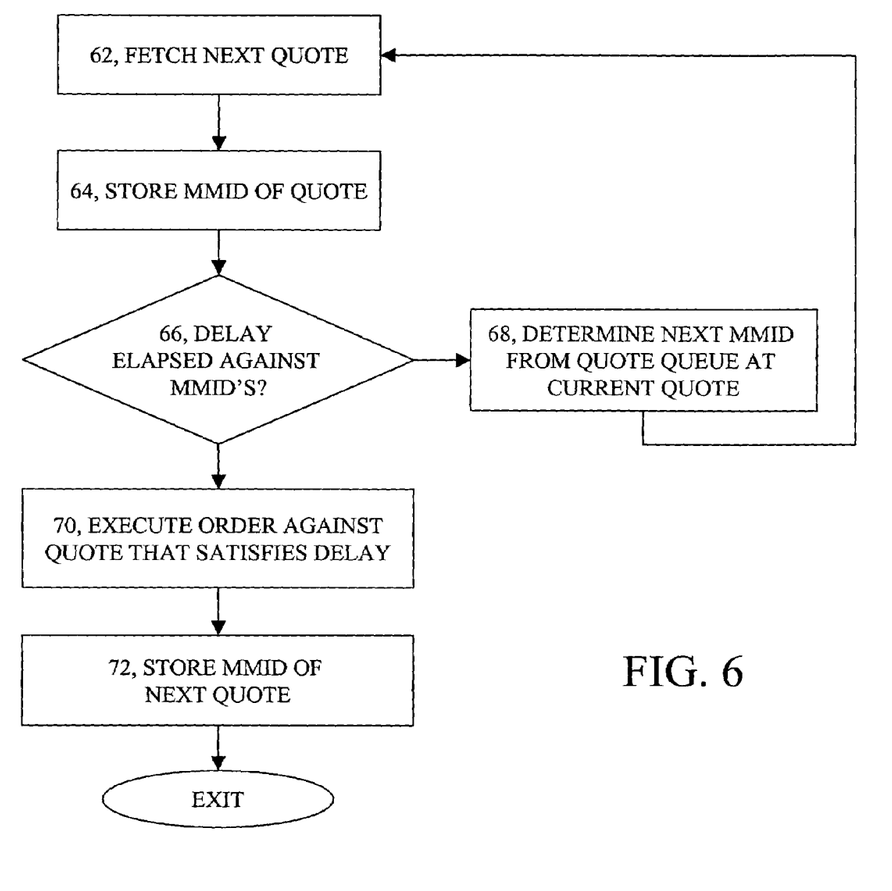
FIG. 6 is a flow chart showing a process for routing order and executions on a negotiation system.

Referring to FIG. 6, an execution process 60 for the protocol for executing small orders over a second different order delivery system such as order systems 14 is shown. Process 60 determines 62 a next quote to execute a received valid order against and parses 64 the quote to extract the MMID (market maker identification) corresponding to the participant who entered the quote in the system 20. The process 60 will determine 66 whether a predetermined delay has elapsed from the last trade with that particular MMID. That is, the process 60 will wait for a predetermined period of time, e.g., 5 seconds to 17 seconds, before executing the order against the same MMID's quote. If the delay has not elapsed, the process will determine 68 the MMID of the next quote at that price, and fetch 62 the quote. The process determine 64 whether the delay has lapsed against that next MMID. The process 60 will continue to fetch subsequent quotes of different MMIDs from the quote queue at the current inside quote until the process 60 finds a quote from an MMID that satisfies the delay requirement. The process 60 will execute 70 the order against the quote that satisfies the delay requirement and store the MMID and execution time of that quote 74.

The system 10 uses auto execution systems 14 as the primary trading and execution medium. The process 60 can be added to currently operating execution systems for small orders from public customers, to transform the trading system into a more efficient, automated facility for the handling of all market traded orders of less than a predetermined number of shares, e.g., 9,900 shares. The orders can be entered for execution against an expanded trading interest accessible through both displayed and reserve size quotes described below.

The auto execution systems 14 automatically execute against market makers' proprietary and agency quotes as described below. The auto execution systems 14 could be expanded to accommodate larger sized quotes and orders up to an indeterminate size.

Market makers can use the systems 14 on a proprietary basis to obtain automatic execution for orders sent to other market participants, when trading market traded securities. The interval delay between automatic executions against the same market maker can be any reasonable time consistent with marker rules and capabilities. An exemplary interval is five [5] seconds.

The system 14 permits interaction of orders against a market maker's "reserve size" after yielding priority to displayed quotes at the same price (including a market maker's posted agency quote). Additionally, market makers will be given the option of having their quote automatically refreshed from that reserve to a size level of their choosing. If no particular size is designated by the market maker, the quote will be automatically refreshed at a 1000 share displayed size level.

Reserve Size

Figure 7:
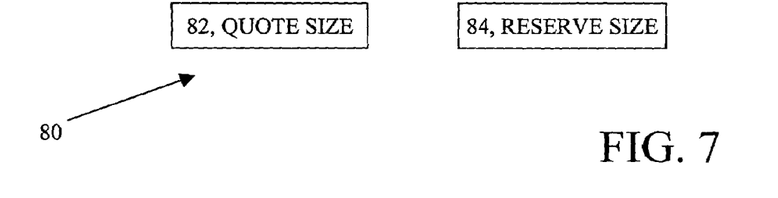
FIG. 7 is a diagram that depicts a quote entry format.

Referring to FIG. 7, a format 80 for entering quotes is shown. The format 80 include a quote size 82 and a reserve size quote 84. Quote size is the conventional size that is attributed to a market participant. Reserve size is additional liquidity that is added to the market but is neither displayed to the market or attributed to any quotation market participant in the market.

The reserve size quote in the market yields priority to all displayed quotes at the same price level. The market system 20 executes against displayed size (agency and proprietary) in time priority and then against the reserve size in time priority. To encourage the display of appropriate order size, the market can require market makers using a reserve size quote to display a minimum number of e.g., 1000 shares in its proprietary quote. Displayed proprietary quotes at the inside of the market can be refreshed at the same price level at a minimum, e.g., 1000+ share levels, in order for a market maker to continue using reserve size.

Market makers can refresh and display at the same inside price at a size less than 1000 shares but not by using reserve size. This restriction need not apply for interim executions against a market maker's un-updated quote. For example, should a market maker displaying an initial quotation of 1000 shares with 5000 shares in reserve be automatically accessed by a market participant for 300 shares in displayed size, that market maker will still be allowed to continue to display its remaining 700 shares and keep 5000 available in reserve size. Should the market maker subsequently update either its displayed or reserve sizes, or its quoted price, the market maker will be obligated to increase its displayed size to 1000 shares in order to continue to use the reserve size quote.

For example, in a situation where there are 3 market makers, ranked in time priority MMA, MMB, MMC, each at the best bid and each displaying 1000 shares and all with 5,000 shares in reserve, the system will handle the order as follows: If a 9,000 share market order is entered, automatically the system 10 would execute against the displayed 3000 shares MMA, MMB and MMC, then the entire 5000 share reserve size of market maker MMA and 1000 shares of market maker MMB 5000 share reserve size in time priority. This fills the order and leaves MMB with 4000 shares in reserve size and MMC with 5000 shares in reserve size. MMA's quote would be completely decremented and drop from the inside market. Since Market Maker MMB's total displayed and reserve quote would not be completely decremented (3500 reserve share size remaining) it would retain its time priority and, assuming it remains the best bid, remain at the top of the quote montage and have its displayed size refreshed from its remaining reserve size. In order to continue quoting shares in reserve size, MMB would select a 1000+ share refresh size. MMC, based on its 5000 share reserve size remainder, would be second in priority in the montage and also have the option of having its displayed quote automatically refreshed from reserve to a size level of its choosing and likewise be subject to a 1000+ share display refresh minimum to be allowed to continue to quote reserve size. MMA's fully exhausted quote will have the option of being automatically refreshed away from the inside market using an automatic quote update process.

Failure to update a fully exhausted quote will result in the system placing the market maker's quote in a "closed" state that, if not updated within a predefined time period, e.g., 5 minutes could result in regulatory action by the market. Market makers will still have the ability, through the automatic quote update facility, to pre-select a tick value and have the system 10 refresh their proprietary quote away from the inside market. This capability would not apply to a market maker's Agency Quote because that quotation represents agency interest. Also agency interest is not required to be two-sided. If a market maker's quote is refreshed to different price or size level, another order will not be delivered to that market maker for e.g., 5 seconds after that quote is refreshed at the new price or size level.

The system 10 could allow continuous executions against a market maker's quote at the same price while decrementing the quoted size. In existing execution system, a NO-DEC rule allows continuous execution against a quote without decrementing quote size. System 10 can allow continuous executions against a market maker's quote at the same price while decrementing the quoted size, since market makers can manage their quote by displaying their actual size. Moreover, with reserve size market makers have the ability to refresh quotes. The NO DEC feature of prior systems inhibits quote competition among market participants and discourages the full display of trading interest. Moreover, given the larger order sizes and faster executions that can be expected in the current trading system 10, a NO DEC rule could inadvertently expose market participants to inappropriate levels of order liability. Also, the NO DEC rule provides no benefits in conjunction with an Agency Quote in that agency quotes will represent the full and complete trading interest of the customer and is inconsistent with unlimited and constant exposure to orders indicated by the use of NO DEC. Other considerations may make the NO DEC rule applicable to system 10.

The system 10 processes orders from order entry systems 14 in time priority rather than using a preferencing feature for market traded securities as is current in the SOES system. The preference feature could be inconsistent with the processing of orders in time priority as in the trading system 10.

Preferencing in an automatic execution system also reduces market maker incentives to aggressively compete for orders by showing the full size and true price of their trading interest. Moreover, preferencing may place agency quotes of public customers at a disadvantage. These factors, especially when combined with mitigation of dual liability, and the ability of market makers to display their actual size, clearly militate in favor of no preferencing.

In the system of FIG. 1, market participants can include the following: Market makers which are participants that are required to submit a two sided proprietary quote into a market and maintain that quote at all times. Participants can also include electronic commerce networks (ECNs) that have an interface to the system 10 and which can submit a one or two sided quote but are not obligated to maintain that quote. A third type of participant is an exchange. National securities exchanges trading pursuant to grants of unlisted trading privilege ("UTP") can access the market through SelectNet or an equivalent link. UTP Exchanges will receive, and be obligated to execute, preferenced SelectNet liability orders, and send SelectNet preferenced liability orders to market makers. While a market maker may still have dual liability in situations where a market maker is accessed by a UTP Exchange via SelectNet and simultaneously by another market maker or order entry firm, such dual liability is manageable.

ECNs can choose to be Order Entry ECNs or Full-Participant ECNs. Market participants would continue to be able to access ECNs via the SelectNet linkage and would continue to be able to send preferenced SelectNet orders of any size (up to 999,999 shares) and with any conditions to such ECNs. The oversized order requirement for a preferenced SelectNet order would not apply to ECNs under this first option. ECNs that choose to have the capability to access other market maker quotes (including Agency Quotes) could do so by requesting order-entry capability in the system. The ECN also could send preferenced SelectNet orders to market makers subject to the oversized order restrictions described previously. This would allow ECNs to access market makers through two systems, but would limit dual liability that market makers currently face since ECN's will only be receiving orders requiring them to execute from the system 10.

Second, an ECN could choose to participate fully in the system ("Full-Participant ECN"). Under this option, the ECN would agree to provide automatic execution for orders received from other participants through the system by the ECN. As with the first option, Full-Participant ECNs could use the system to obtain automatic execution of orders they send to market makers or other Full-Participant ECNs.

Referring to FIG. 8, a dynamic quote window 150 includes a negotiation montage 152 that displays current quotes in the system 20 from market participants who can post quotes. The dynamic quote window 150 includes aspects of the conventional Nasdaq II Workstation® quote window. The dynamic quote window 150 also includes a plurality of aggregate interest buttons, i.e., controls 154a-154c and 156a-156c that are between the quote montage and the upper portion of the window. These aggregate interest buttons or controls 154a-154c and 156a-156c can be color coded, e.g., white, green and blue. Each one of the aggregate interest buttons or controls displays a price level that is either at the inside price e.g., white or one tick away, e.g., green or two ticks away, e.g., blue from the inside. Displayed next to the price level within the buttons 154a-154c and 156a-156c are aggregated number of shares at those price levels. In one embodiment aggregated number of shares is just displayable size but in other embodiments it can include reserve size. Thus, in the arrangement of FIG. 8, the white aggregate interest buttons or controls 154a and 156a are at the inside prices, the green aggregate interest buttons or controls 154b and 156b are one tick away from the inside bid or offer prices and the blue aggregate interest buttons or controls 154c and 156c are two ticks away from the inside bid or offer prices.

Quotes in the negotiation montage 152 can be shaded with the same colors used for the buttons or controls e.g., white, green and blue. In addition, quotes beyond the third price level can be shaded a different color e.g., gray.

The white aggregate interest buttons or controls 154a and 156a are towards the middle, of the montage representing the inside bid and offer price levels, and display "40 1/16" "55" and "40 1/8" "50" respectively representing the best bid price 40 1/16 size of 55, e.g., 5500 shares and best offer e.g., 40 1/8 size of 50, i.e., 5000 shares. The other two sets of aggregate interest buttons or controls 154b, 154c and 156b, 156c display similar prices and quote sizes at different price levels. Selecting any aggregate interest buttons or controls launches a multi-order window as discussed in FIG. 9.

The system 20 can have different quotes at different price levels for various reasons. Market makers can be required to maintain a two-sided quote i.e., a bid quote and an offer quote. However, market makers are not required to quote at the inside. The system 20 tracks all quotes and displays the best quote that each market maker has in the system in the montage 152. Market makers might not want to be at the inside liquidity. Thus, a market maker can have one quote at the inside and the other quote spread out from the inside based on its trading strategy.

As shown, there is bid by market maker MLCO at the second price level 40. Liquidity may move to that bid if a large order is entered and executes through the inside 5,500 shares. Therefore, the montage 150 with the aggregate buttons 154a-154c and 156a-156c displays aggregated quotes at various price levels that represents publically displayed, available liquidity. Thus, market participants can see the depth of the quotes at the inside. In today's trading the inside quote plus two ticks away is where the most of the liquidity generally exists in the market. Generally, one tick or two ticks away is within striking range of being executed.

Quotes away from that the inside plus two ticks are generally not real, current liquidity although the quotes may represent future liquidity if the market keeps moving in those particular directions. The upper portion 158 of the dynamic quote window displays information as generally presented in a conventional Nasdaq II Workstation. The middle portion of the dynamic quote window 150 also has a region 159 for updating quote sizes in a conventional Nasdaq II Workstation.

Referring to FIG. 9, when a user clicks on one of the buttons 154*a*-154*c* and 156*a*-156*c* (FIG. 8), a multi-order entry window 170 is launch. The multi-order window 170 shows an allocation of shares that are appropriate, depending on the montage ranking at the moment one of the aggregate interest buttons or controls is pressed, according to order filing rules in effect in the market system. A non limiting example of such rules is described above. Transmitting the generated orders will in effect attempt to capture all shares available at the price corresponding to the aggregate interest button or control that was depressed and better. Thus, when a white aggregate interest button or control 154*a*, 156*a* is depressed the system generate order(s) for all shares available at the inside bid or ask. Pressing a green aggregate interest button or control 154*b*, 156*b* will have the system produce order(s) for all shares at the second price level plus all shares available at the inside, e.g., first price level. Pressing a blue aggregate interest button or control 154*c*, 156*c* generates order(s) for all shares available at the third, second, and inside price levels.

The system 20 performs automatic price improvement for SOES orders, the SOES orders will execute at the best available price. The preferred SelectNet orders will be sent individually to the Market Participants in the montage ranking. Thus shares are allocated across market participants based on the stock, the type of participant and the participants quoted size in the market.

For example, the inside price is 40¹⁄₁₆ on the bid side and if a user clicks on control 154*a* (FIG. 8), the multi-order window 170 is displayed populated with quotes from the 40¹⁄₁₆ level. The user clicks on the 40¹⁄₁₆ button and the multi-order window 170 would display all 6 quotes at 40¹⁄₁₆, and the multi-order window 170 would be populated with those quotes to execute at that price. The multi-order window 170 is populated with orders to sell at 40¹⁄₁₆ to RSSF 1,000 shares, a second order, to sell 1,000 shares to PWJC at 500 shares, so forth.

The multi-order window 170 is also populated based on an order of execution preference in the system 20, as described above. For example, the multi-order window 170 is populated based on whether the quote is from a SOES or SelectNet participant. The system determine whether the participant is a SOES or SelectNet participant based upon the market participant ID. For example, the "P" next to certain market makers indicates that the market maker is a primary market maker and participates in SOES auto-execution. The system 20 that produces the multi-order window 170 allocates an auto-execution order to those market participants. For others such as ECN's, STRK# and ISLD# that are SelectNet delivery participants the window would display allocated SelectNet orders for them for 1,000 shares each. UTP exchanges and non-SOES ECN's would be governed as above.

Auto-execution market makers orders are executed within the system 20, whereas, the order delivery participants are executed through SelectNet. This window allows the system to feed orders into SelectNet and contemporaneously feed the orders into SOES based on the participants that are at the inside and the way they participate in the system using the preferences and rules described above.

The order display window 150 can also generate conventional SelectNet or SOES orders using convention order entry screens. In addition, double-clicking on a quote in the negotiation portion of the dynamic quote window 150 generates a SelectNet order (at the opposite side of the market) preferenced to the market maker whose quote is selected. The order's size and delivery would be governed by rules above.

The multi-order window 170 breaks up orders to access available liquidity based on how quotes exist in the market system 20 at the time that the order is filled. Thus, in the example some of the shares are only accessible through order delivery, i.e., are SelectNet orders. The multi-order window 170 has a buy/sell order, at the amount that equals the quote sizes at the inside. For SOES orders, the system does not designate a person who it gets delivered to because there is no preferencing, i.e., they are "nondirected orders." For SelectNet orders the multi-order window 170 designates the participant to receive the order. The multi-order window 170 has check boxes that can be used to deselect orders based on changes in liquidity. The user can hand edit order fields to change individual order sizes if desired.

The multi-order window 170 also includes the total aggregate shares, at that price, order quantity, and an auto close control. There are also controls for entering a minimum quantity e.g., any and all or none. There are also controls for designating principal and agent, i.e., a proprietary order or an order for a customer. Close cancels the order and send sends the order. If Auto Close" in the Multi-Order Entry window is selected prior to pressing the Send button, then pressing Send to transmit orders in the Multi-order Window will automatically close the Multi-order window upon receipt of the last "Accepted" response for the order. If any errors are returned, e.g., a order is not accepted, the auto close, will not close the multi-order window.

Other embodiments are within the scope of the appended claims.

What is claimed is:

1. A computer program product, residing on a computer readable medium for executing instructions on a processor, the computer program product being operable to cause the processor to generate a graphical user interface for an electronic trading system, the graphical user interface comprising:

a dynamic quote montage that that is rendered on an electronic display device; the dynamic quote montage comprising:

a negotiation montage that lists quotes at various price levels for a product, the quotes being posted from a plurality of market participants; and a plurality of controls that display a plurality of price levels for quotes for the product at current pricing conditions for the product with each of the controls displaying a value corresponding an aggregated number of shares at one of the plurality of price levels with the value of the number of shares being juxtaposed the price level, the plurality of controls being color coded wherein selection of one of the controls launches a market order entry window.

2. The computer program product of claim 1 wherein the negotiation montage displays bid or ask quotes or both for the product.

3. The computer program product of claim 1 wherein the controls color coding corresponds to a color coding indicia applied to corresponding ones of bid or ask quotes displayed in the negotiation montage.

4. The computer program product of claim 1 wherein each of the controls are color-coded with different colors.

5. The computer program product of claim 1 wherein quotes in the negotiation montage are color-coded based upon a color coding assigned to each of the plurality of controls.

6. The computer program product of claim 1 wherein market order entry window is a multi-order entry window and the multi-order window shows an allocation of shares based on the montage ranking at the moment the one of the controls is selected according to order filing rules in effect in the market system.

7. The computer program product of claim 6 wherein the multi-order entry window is automatically populated with quotes available at the selected price level.

8. The computer program product of claim 7 wherein the multi-order entry window is automatically populated by order-type based on a security with quotes at the selected price levels.

9. The computer program product of claim 8 wherein the order types are auto execution and delivery orders.

10. The computer program product of claim 1 wherein the multi-order entry window depicts the type of orders that are entered in the window.

11. The computer program product of claim 1 wherein the plurality of controls are aggregation controls that display a plurality of price levels for quotes for the product at current pricing conditions for the product and display an aggregated size of the quotes at the price level displayed in the control.

12. The computer program product of claim 1 wherein the quotes are for financial products.

13. The computer program product of claim 1 wherein the financial products are stocks.

14. A computer program product residing on a computer readable medium for executing instructions on a processor, the computer program product being operable to cause the processor to generate a dynamic quote window for a securities system, the dynamic quote window comprising:
 a quote montage rendered on an electronic monitor, the quote montage displays quotes from market participants to buy or sell a security;
 a plurality of controls disposed proximate to the quote montage, each of the controls displaying a price level and aggregated quote size at the price level for the security, the plurality of controls being color coded to associate with corresponding quotes in the montage and with selection of one of the controls launching a market order entry window.

15. The computer program product of claim 14 wherein the plurality of controls that display the price levels and aggregated size, display current price and size conditions in a market.

16. The computer program product of claim 14 wherein quotes in the quote montage are color-coded based upon a color coding assigned to each of the plurality of controls.

17. A method of submitting an order in an electronic trading system comprises:
 displaying on an electronic display device a graphical user interface for the electronic trading system, the graphical user interface including a negotiation montage that displays quotes for at least one side of bid or ask quotes at various price levels for a product and a plurality of controls, each of the controls displaying a price level and an aggregate of all size of quotes or orders at that price level for quotes or orders that currently exist in the electronic trading system at that price for the at least one of bid or ask quotes that display a plurality of price levels for quotes for the product at current pricing conditions for the product; and
 selecting one of the plurality of controls to enter an order at the opposite side of the market from the quote for quotes that are in the system at the price level represented in the control, wherein the plurality of controls are color coded to associate the controls with corresponding quotes in the negotiation montage.

18. The method of claim 17 wherein selecting one of the controls in the graphical user launches a multi-order entry window which is automatically populated by quotes of the product with at the price level.

19. The method of claim 17 wherein selecting one of the controls in the graphical user further comprises:
 transmitting orders to capture all shares available at the price corresponding to the control that was selected and better.

20. The method of claim 17 wherein selecting one of the controls in the graphical user further comprises:
 launching a multi-order entry window which is rendered on the electronic display device and is automatically populated by all quotes for execution or delivery at the price level based on trading rules in the market.

21. A computer program product residing on a computer readable for executing instructions on a processor, the computer program product being operable to cause the processor to rank quotes available at selected price levels by order-type based on market participant; and generate a graphical user interface for an electronic trading system, the graphical user interface for the electronic trading system comprising:
 a market order entry window for initiating trading of a financial security, the market order entry window being rendered on an electronic display device and being automatically populated with quotes available at selected price levels ranked by order-type based on market participant.

22. The computer program product of claim 21 wherein the market order entry window is launched in response to a user selecting a control from a plurality of controls that display a plurality of price levels for quotes for the security at current pricing conditions for the security.

23. The computer program product of claim 22 wherein the quotes are for financial products.

24. A trading system for an electronic market system, comprises:
 a computer; and
 an electronic display device responsive to signals from the computer the signals rendering on the electronic display device:
 a dynamic quote montage comprising:
 a negotiation montage that lists quotes at various price levels for a product, the quotes being posted from a plurality of market participants in the market system; and
 a plurality of controls each of the controls displaying a value of aggregate interest at a corresponding price level and with an aggregated number of shares being juxtaposed the price level, the plurality of controls being color coded wherein selection of one of the controls launches a market order entry window.

25. The system of claim 24 wherein the negotiation montage displays bid or ask quotes or both for the product.

26. The system of claim 24 wherein the controls color coding corresponds to a color coding indicia applied to corresponding ones of bid or ask quotes displayed in the negotiation montage.

27. The system of claim 24 wherein each of the controls are color-coded with different colors corresponding to colors assigned to quotes in the negotiation montage.

28. The system of claim 24 wherein the market order entry window is a multi-order entry window and the multi-order window shows an allocation of shares based on the montage ranking at the moment the one of the controls is selected according to order filing rules in effect in the market system.

29. The system of claim 28 wherein the multi-order entry window is automatically populated by signals from the computer system with quotes that are available at the price level corresponding to the selected control.

30. The system of claim 28 wherein the multi-order entry window is automatically populated according to a ranking based on order-type for a security with quotes at selected price levels.

31. The system of claim 30 wherein the order types are auto execution and delivery orders.

32. The system of claim 24 wherein the product is a stock and the plurality of controls are aggregation controls that display a plurality of price levels for quotes for the stock at current pricing conditions for the stock and displays an aggregated size of the quotes for the stock at the price level displayed in the control.

* * * * *